2,947,784
PREPARATION OF N,N-DIBUTYL ANILINE

James C. Martin and Robert H. Hasek, Kingsport, Tenn., assignors to Eastman Kodak Company, Rochester, N.Y., a corporation of New Jersey No Drawing. Filed July 31, 1957, Ser. No. 675,243

4 Claims. (Cl. 260—577)

This invention concerns a process for preparing N,N-di-n-butyl aniline.

N,N-di-n-butyl aniline is a well known and useful commercial chemical. This material has particular utility in the preparation of N,N-di-n-butyl-p-(p'-nitrophenylazo) aniline which was described by John W. Thompson in co-pending application U.S. Serial No. 510,855, filed May 24, 1955, as a useful dye for gasoline.

Several methods have been proposed for preparing N,N-di-n-butyl aniline. One method involves reacting aniline with tributylphosphate, this method, however, being relatively costly when considered as a commercial process. Another process for preparing N,N-di-n-butyl aniline comprises reacting nitrobenzene, butyraldehyde and hydrogen in the presence of a platinum catalyst for over 90 hours, such an extended reaction time being undesirable. Further, some methods for preparing N,N-di-n-butyl aniline result in low yields or the formation of reaction by-products such as polymeric materials in the course thereof.

It is an object of this invention to provide a new and improved process for preparing N,N-di-n-butyl aniline.

It is another object of this invention to prepare N,N-di-n-butyl aniline in almost quantitative yields by a new process.

It is still another object of this invention to prepare N,N-di-n-butyl aniline by a novel process utilizing a less expensive catalyst than platinum.

It is also an object of this invention to prepare N,N-di-n-butyl aniline by an improved process requiring a relatively short reaction time.

It is likewise an object of this invention to prepare N,N-di-n-butyl aniline by a novel process comprising the addition of the reactants to the reaction zone in a specific order or sequence under carefully controlled reaction conditions.

These and other objects will be readily apparent from the description and claims which follow.

N,N-di-n-butyl aniline is prepared in accordance with the present invention by the process which comprises introducing n-butyraldehyde into a reaction vessel containing aniline, a palladium catalyst and an acid under a hydrogen atmosphere at controlled pressure and temperature conditions, and thereby reductively butylating the aniline. The process can be illustrated by the following equation:

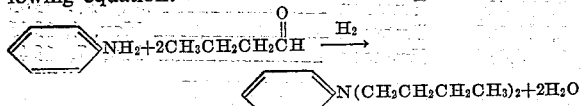

Palladium is the catalyst in the instant hydrogenation reaction, preferably being supported on an inert material such as powdered alumina, powdered carbon, or the like, in the usual manner. The palladium is employed in catalytic amounts in accordance with usual hydrogenation practice. Typically, palladium corresponding to at least about 0.1%, and more generally 0.3%, by weight of the reactants is employed. The concentration of palladium on the inert catalyst support is usually between 0.5 and 5.0%.

A water-miscible solvent that is inert to the reactants and the hydrogenation is desirably employed in the process. Such a solvent tends to facilitate the reaction by minimizing clumping of the catalyst material by the water liberated during the course of the reaction. Such solvents as ethanol and isopropanol are particularly useful in the present process, although other inert water-miscible solvents such as dioxane, methanol and the like can be utilized.

The reaction is carried out under carefully controlled temperature conditions. Temperatures in the range of 15°–35° C. are preferably used, with temperatures in the range of 10°–50° C. being suitably employed. If the reaction temperature is too high, aldol condensation of the aldehyde tends to take place.

The present reaction is effected under a hydrogen atmosphere at elevated pressures. The reaction can be effected under a wide range of pressures, with pressures of about 500–4000 p.s.i. being suitable, with pressures of about 750–3500 p.s.i. being preferred, and with pressures of about 1000–3000 p.s.i. being eminently suitable.

The instant hydrogenation reaction is effected under acidic conditions. Large excesses of acid are not necessary with the present palladium catalyst, with acid in amounts sufficient to make the reaction mixture acidic being sufficient. Related prior art hydrogenation processes using acidic reaction conditions typically require the use of several times more acidic material than is needed in the present process. Acetic acid is the preferred acid and can be suitably employed in amounts of less than 1% by weight of the reactants. Other suitable acids include propionic acid, butyric acid, hydrochloric acid, sulfuric acid and comparable acid materials.

In carrying out the process of the invention, the amount of n-butyraldehyde in the reaction zone or reaction vessel is carefully controlled. If the concentration of n-butyraldehyde in the reaction vessel is too high, appreciable quantities of high-boiling by-products are obtained, and the yield of N,N-di-n-butyl aniline is relatively low. We have found that almost quantitative yields can be obtained by introducing the n-butyraldehyde to the aniline, hydrogen, palladium, acid and solvent in the reaction vessel, as distinguished from mixing the reactants together prior to being introduced into the reaction vessel. Preferably, the n-butyraldehyde is introduced into the reaction vessel containing the other reactants at a controlled rate substantially equal to the rate of reaction of the n-butyraldehyde with the aniline in the reaction vessel. Also, an excess of n-butyraldehyde in the reaction vessel can be obviated in a continuous process by introducing n-butyraldehyde to a mixture of aniline, acid and solvent, without prior mixing, into the reaction vessel containing the palladium catalyst, the reactants being appreciably diluted with correlated amounts of recycle portions of the reaction product so that the rate of introduction of n-butyraldehyde into the reaction vessel is substantially equal to the rate of reaction of the n-butyraldehyde and the aniline.

The present process is carried out in a high pressure reaction vessel or autoclave that is preferably equipped with a stirrer or a rocking or agitating means. Also, the reaction vessel is desirably equipped with an internal cooling coil or other cooling means to maintain the temperature of the present exothermic reaction within the prescribed temperature ranges. In a typical operation of the present process, the palladium catalyst supported on an inert material, an acid such as acetic acid, aniline and a suitable inert water-miscible solvent such as ethanol are placed in the reaction vessel. Hydrogen is added to the reaction vessel to produce the desired pressure. Thereafter, n-butyraldehyde is slowly pumped into the reaction vessel as described hereinabove, the temperature of the reaction being regulated with cooling coils in the reaction vessel. With the present catalyst and reaction conditions, high yields of N,N-di-n-butyl aniline result in relatively short reaction times. The reaction of the present process can be typically effected in about 1 to 4 hours, while related prior art methods for preparing N,N-di-n-butyl aniline by hydrogenation reactions typically require reaction times of more than 90 hours. After completion of the reaction, the N,N-di-n-butyl aniline can be readily separated from the reaction mixture by fractional distillation. Yields in excess of 90% are not uncommon in the present process.

The invention is illustrated by the following examples of preferred embodiments thereof.

Example 1

(a) Into a stainless steel, rocking-type autoclave equipped with an internal cooling coil and having a volume of 1680 ml., was added 186 g. of aniline, 300 ml. of ethanol, 4 ml. of acetic acid and 25 g. of 5% palladium supported on powdered alumina (approximately 200 mesh). Hydrogen was then added to the autoclave to a pressure of 3000 p.s.i. Thereafter, 370 g. of freshly distilled n-butyraldehyde were pumped into the autoclave over a period of one hour, with the reaction temperature being maintained at 18–20° C. and the pressure maintained at 3000 p.s.i. by the addition of more hydrogen. The reactants were allowed to remain in the autoclave at 18–20° C. for about 2.5 hours. Then the autoclave was vented and the contents filtered. The resulting filtrate was subjected to vacuum distillation through a packed column to give 382 g. of N,N-di-n-butyl aniline, B.P. 144–146° C. (15 mm.) $N_D^{20}$ 1.5165. This distilled product had a neutralization equivalent of 204.5, the calculated value for the empirical formula of N,N-di-n-butyl aniline ($C_{14}H_{23}N$) being 205. The yield of N,N-di-n-butyl aniline based on the aniline was 93%.

(b) For comparison purposes, the above process was effected by charging all of the reactants into the autoclave simultaneously as distinguished from adding the n-butyraldehyde to the other reactants as described above. The following materials were charged into the autoclave described above: 186 g. of aniline, 300 ml. of ethanol, 4 ml. of acetic acid, 370 g. of n-butyraldehyde and 25 g. of 5% palladium supported on powdered alumina. Hydrogen was added to the autoclave to a pressure of 3000 p.s.i. The resulting reaction mixture was maintained at 18–20° C. for about 2.7 hours and the pressure was maintained at 3000 p.s.i. by the addition of more hydrogen. The autoclave was thereafter vented and the contents were discharged and filtered. The filtrate was then vacuum distilled through a packed column, and after removal of the solvent and a small amount of mono-n-butyl aniline, 60 g. of N,N-di-n-butyl aniline were distilled over having a B.P. 144–146° C. (14 mm.). The remainder of the product of the reaction was a higher boiling material of undetermined composition. The yield of N,N-di-n-butyl aniline based on the aniline was 29%.

Example 2

Into a stainless steel autoclave equipped with a stirrer and an internal cooling coil and having a volume of 3600 ml. was added 372 g. of aniline, 600 ml. of isopropanol, 6 ml. of acetic acid and 35 g. of 5% palladium supported on powdered carbon. Hydrogen was then added to the autoclave to a pressure of 1000 p.s.i. Thereafter, 605 g. of freshly distilled n-butyraldehyde were pumped into the autoclave over a period of 1.5 hours, with the reaction temperature being maintained at about 30° C. The reactants were allowed to remain in the autoclave for about 1.5 hours and the pressure was maintained at 1000 p.s.i. by the addition of more hydrogen. Then the autoclave was vented and the contents filtered. The filtrate was vacuum distilled through a packed column to give a 94% yield of N,N-di-n-butyl aniline.

As illustrated by the above examples, the present improved process results in the preparation of N,N-di-n-butyl aniline in almost quantitative yields. Further, the reaction time required in the present process is relatively short. Also, expensive platinum catalysts are not necessary in the instant process. Thus, we have found that by introducing the n-butyraldehyde to the other reactants in the reactor in the present process, as distinguished from admixing the reactants together in the usual manner prior to being introduced into the reactor, and by employing the present palladium catalyst under the reaction conditions described hereinabove, an improved method for preparing N,N-di-n-butyl aniline results.

Although the invention has been described in considerable detail with reference to certain preferred embodiments thereof, it will be understood that variations and modifications can be effected within the spirit and scope of the invention as described hereinabove and as defined in the appended claims.

We claim:

1. In the preparation of N,N-di-n-butylaniline by hydrogenating n-butyraldehyde and aniline in a reaction zone in the presence of palladium and acetic acid at a pressure of 500–4,000 p.s.i. and at a temperature of 10°–50° C., the improvement which comprises introducing the n-butyraldehyde into said reaction zone during the said hydrogenation at a controlled rate substantially equal to the rate of reaction of the n-butyraldehyde with the aniline in said reaction zone.

2. In the preparation of N,N-di-n-butylaniline by hydrogenating n-butyraldehyde and aniline in a reaction zone containing palladium and acetic acid at a pressure of 750–3,500 p.s.i. and at a temperature of 15°–35° C., the improvement which comprises introducing the n-butyraldehyde into said reaction zone during the said hydrogenation at a controlled rate substantially equal to the rate of reaction of the n-butyraldehyde with the aniline in said reacttion zone.

3. In the preparation of N,N-di-n-butylaniline by hydrogenating n-butyraldehyde and aniline in a reaction zone containing palladium and acetic acid in ethanol at a pressure of 750–3,500 p.s.i. and at a temperature of 15°–35° C., the improvement which comprises introducing the n-butyraldehyde into said reaction zone during the said hydrogenation at a controlled rate substantially equal to the rate of reaction of the n-butyraldehyde with the aniline in said reaction zone.

4. In the preparation of N,N-di-n-butylaniline by hydrogenating n-butyraldehyde and aniline in a reaction zone containing palladium and acetic acid in isopropanol at a pressure of 750–3,500 p.s.i. and at a temperature of 15°–35° C., the improvement which comprises introducing the n-butyraldehyde into said reaction zone during the said hydrogenation at a controlled rate substantially equal to the rate of reaction of the n-butyraldehyde with the aniline in said reaction zone.

References Cited in the file of this patent

UNITED STATES PATENTS

| 2,380,420 | Emerson | July 31, 1945 |
| 2,388,608 | Emerson | Nov. 6, 1945 |
| 2,414,031 | Emerson | Jan. 7, 1947 |

FOREIGN PATENTS

| 376,013 | Germany | May 25, 1923 |
| 515,574 | Canada | Aug. 9, 1955 |

OTHER REFERENCES

Major: Journal of the American Chemical Society, vol. 53, pages 4373 to 4378 (1931).